UNITED STATES PATENT OFFICE.

WILLIAM G. LINDSAY, OF CALDWELL, NEW JERSEY, ASSIGNOR TO THE CELLULOID COMPANY, OF NEW YORK, N. Y., A CORPORATION OF NEW JERSEY.

PLASTIC COMPOSITION.

1,188,798.   Specification of Letters Patent.   Patented June 27, 1916.

No Drawing.   Application filed May 23, 1912. Serial No. 699,234.

*To all whom it may concern:*

Be it known that I, WILLIAM G. LINDSAY, a citizen of the United States, residing in Caldwell, county of Essex, State of New Jersey, have invented certain new and useful Improvements in Plastic Compositions, of which the following is a specification.

The various compositions to which the present invention relates are employed in the arts, sometimes as imitations of natural substances, and sometimes as films which are used for photographic purposes, whether as the base upon which the sensitive coating is superimposed or as a component part of the film with which the sensitized substance has been partially incorporated in the sensitization. Although the final or useful form of the different compounds of acetyl cellulose is that of a solid or dry material, the different processes of conversion into this final solid form involve, as is well understood, the employment of solutions or mixtures of varying consistencies as to elasticity, stiffness or fluidity, depending generally upon the proportion or kind of solvent used to the amount of the original base—acetyl cellulose.

In the treatment of acetyl cellulose for the production of solutions for the manufacture of lacquers, varnishes, photographic films, and flexible or plastic compounds, I have discovered that chloroform in admixture with ethyl or methyl alcohol produces a compound solvent for acetyl cellulose of the variety which is freely soluble in acetone and also of the so-called triacetate of cellulose, possessing valuable properties in the manufacture of films or plastic masses.

The following examples will instruct the operator as to the methods of employing these new solvents:—To 100 parts of acetyl cellulose (so-called triacetate of cellulose) I add from 30 to 40 parts either of paraethyltoluolsulfonamid, being one of the aryl sulfonamids, ethyl acetanilid, tetrachlorethyl acetanilid, methyl acetanilid, or camphor, and then put into the mixture 100 parts of chloroform in admixture with 10 to 20 parts of a monohydric alcohol having not more than two carbons such as ethyl or methyl alcohol. The mixture is then stirred or otherwise kneaded, and after a uniform mixture has been obtained the volatile solvent is allowed to evaporate to the extent of about 70 parts during the stirring or mixing operation. The dough-like mass thus obtained is then rolled or worked up in the manner of manufacturing nitro-cellulose-camphor compounds.

Again, to 100 parts of acetyl cellulose of the variety described I add 30 to 50 parts of paraethyltoluolsulfonamid, or one of the other solid substances named,—(ethyl acetanilid, tetrachlorethyl acetanilid, methyl acetanilid, camphor), and then add 50 to 70 parts of chloroform mixed with an equal volume of methyl or ethyl alcohol. After a thorough incorporation and kneading, the excess of solvent is allowed to evaporate in the further manipulation, and the resultant dough-like product is further worked up in the well-known manner for making nitro-cellulose-camphor compounds.

Having thus described my invention, what I claim is:—

1. The composition of matter which comprises acetyl cellulose, paraethyltoluolsulfonamid, chloroform, and a monohydric alcohol having not more than two carbon atoms, substantially as described.

2. The composition of matter which comprises acetyl cellulose, an aryl sulfonamid, chloroform, and a monohydric alcohol having not more than two carbon atoms, substantially as described.

3. The composition of matter which comprises a mixture of about 100 parts of acetyl cellulose, about 30 to 40 parts of an aryl sulfonamid, about 100 parts of chloroform containing about 10 to 20 parts of a monohydric alcohol having not more than two carbon atoms, substantially as described.

WILLIAM G. LINDSAY.

Witnesses:
RUTH MEYERSON,
J. E. HINDON HYDE.

Correction in Letters Patent No. 1,188,798.

It is hereby certified that in Letters Patent No. 1,188,798, granted June 27, 1916, upon the application of William G. Lindsay, of Caldwell, New Jersey, for an improvement in "Plastic Compositions," an error appears in the printed specification requiring correction as follows: In line 61, before the word "variety" insert the words *acetone soluble;* and that the said Letters Patent should be read with this correction therein that the same may conform to the record of the case in the Patent Office.

Signed and sealed this 22d day of August, A. D., 1916.

[SEAL.]

F. W. H. CLAY,
*Acting Commissioner of Patents.*

Cl. 106—40.